United States Patent [19]

Kudo

[11] 4,444,473

[45] Apr. 24, 1984

[54] GAUSS TYPE LENS SYSTEM

[75] Inventor: Yoshinobu Kudo, Osaka, Japan

[73] Assignee: Minolta Camera Kabushiki Kaisha, Osaka, Japan

[21] Appl. No.: 189,224

[22] Filed: Sep. 22, 1980

[30] Foreign Application Priority Data

Oct. 4, 1979 [JP] Japan .................. 54-128564
Jan. 23, 1980 [JP] Japan .................. 55-7099

[51] Int. Cl.³ .................................... G02B 9/60
[52] U.S. Cl. ........................................ 350/467
[58] Field of Search ............................... 350/467

[56] References Cited

U.S. PATENT DOCUMENTS 2,683,396  7/1954  Klant et al. ................. 350/467
4,131,335  12/1978  Kimura ....................... 350/467

FOREIGN PATENT DOCUMENTS 1118491  11/1961  Fed. Rep. of Germany ...... 350/467
2809324  9/1978   Fed. Rep. of Germany ...... 350/467
38-11587  7/1963   Japan .
49-53419  5/1974   Japan .
52-114322 9/1977   Japan .
52-146620 12/1977  Japan .
53-108426 9/1978   Japan .
53-131034 11/1978  Japan .
54-104334 8/1979   Japan .
54-156629 12/1979  Japan .
291256   9/1953   Switzerland ................. 350/467

*Primary Examiner*—John K. Corbin
*Assistant Examiner*—Scott J. Sugarman
*Attorney, Agent, or Firm*—Jackson, Jones & Price

[57] ABSTRACT

The present invention provides an improved Gauss type lens system of a five unit six element construction which fulfills the following lens conditions:

$$0.05 \frac{1}{f} < \frac{1}{r_8} < 1.4 \frac{1}{f} \qquad (1)$$

$$0.52 f < \Sigma d < 0.65 f \qquad (2)$$

$$0.8 \frac{1}{f} < \frac{1}{f_1} < 1.3 \frac{1}{f} \qquad (3)$$

$$0.06 \frac{1}{f} < \left| \frac{1}{f_{45}} \right| < 0.5 \frac{1}{f}, f_{45} < 0 \qquad (4)$$

$$0.2 \frac{1}{f} < \left| \frac{1}{F_{23}} \right| < 0.5 \frac{1}{f}, F_{23} < 0 \qquad (5)$$

wherein: f represents the focal length of the whole lens system; $r_8$ represents the radius of curvature of the intermediate cemented surface of the doublet of the fourth unit; $\Sigma d$ represents the total length of the whole lens system; $f_1$ represents the focal length of the first unit; $f_{45}$ represents the focal length of the fourth unit; and $F_{23}$ represents the focal length of an air lens formed between the second and third units ($F_{23} = N_3/\phi_{23}$, if the refractive power of the air lens is $\phi_{23}$).

13 Claims, 29 Drawing Figures

Spherical Aberration
Sine Condition

FIG.2b

Astigmatism

FIG.2c

Distortion

Spherical Aberration
Sine Condition

FIG.4b

Astigmatism

FIG.4c

Distortion

Spherical Aberration
Sine Condition

FIG.6b

Astigmatism

FIG.6c

Distortion

Spherical Aberration
Sine Condition

FIG.10b

Astigmatism

FIG.10c

Distortion

FIG.11a

Spherical Aberration
Sine Condition

FIG.11b

Astigmatism

FIG.11c

Distortion

FIG.12a

Spherical Aberration
Sine Condition

FIG.12b

Astigmatism

FIG.12c

Distortion

FIG.13a

Spherical Aberration
Sine Condition

FIG.13b

Astigmatism

FIG.13c

Distortion

GAUSS TYPE LENS SYSTEM

BACKGROUND OF THE INVENTION

1. Field of the Invention

The present invention relates to an objective lens system for use in a single lens reflex camera, and more particularly, to an improved compact Gauss type lens system of five units and six lens elements.

2. Description of the Prior Art

Numerous attempts have been made in the prior art to improve Gauss type lens systems for single lens reflex cameras. Recently, the demands of the consuming public have required smaller and more compact lightweight single reflex cameras. Attempts have been made to provide five lens units, six lens elements systems of a compact configuration, such as U.S. Pat. Nos. 4,131,335 and 3,817,603. Additional examples are shown in Japanese Patent publication No. 38-11587, and Japanese Laid-Open Patent application Nos. 52-114322, 49-53419, 52-108426, 52-146620, 53-110822, 53-131034, 54-104334 and 54-156629.

As can be readily determined, the prior art is relatively crowded. Some of these prior art Gauss type lens systems are constructed of relatively economical glass material of low refractive indices and provide a relatively long back focal length. There have been problems, however, in shortening the total length of the lens system to meet the requirements of compactness and lightness in weight. Attempts to satisfy these conflicting design parameters have been made with the use of a relatively expensive glass material of relatively high refractive indices.

As can be readily appreciated, the rigors of competition in the camera industry forces a lens manufacturer to be acutely aware of the cost competitiveness of his product. There is a demand in the photography field to provide an improved Gauss type lens system of a five lens unit, six lens element that provides an adequate back focal length while shortening the total length of the lens system with the use of a relatively economical glass material while of course providing proper correction of aberrations.

SUMMARY OF THE INVENTION

An object of the present invention is to provide an improved Gauss type lens system of a five lens unit, six lens elements for use in a single lens reflex camera which is both economical and compact.

Another object of the present invention is to provide a modified Gauss type lens system of a five unit, six lens elements having a sufficient back focal distance that is longer than about 72% of the focal length of the whole lens system, has a field angle of about 46° and an aperture ratio of approximately 1/2.0.

A still another object of the present invention is to provide the above mentioned lens system with the distortion well corrected as well as other aberrations.

A further object of the present invention is to use relatively low refractive indexed glass in the manufacturing of the compact lens system.

The present invention is directed to an improved Gauss type lens system of a five lens unit, six lens elements design having from the object to the image side a positive meniscus single lens element convex to the object side; a first positive meniscus single lens element conves to the object side; a second positive meniscus single lens element convex to the object side; a third negative meniscus single lens element convex to the object side; a fourth doublet and a fifth positive lerns element. The lens system fulfills the following conditions:

$$0.05 \frac{1}{f} < \frac{1}{r_8} < 1.4 \frac{1}{f}$$

$$0.52 f < \Sigma d < 0.65 f$$

$$0.8 \frac{1}{f} < \frac{1}{f_1} < 1.3 \frac{1}{f}$$

$$0.06 \frac{1}{f} < \left| \frac{1}{f_{45}} \right| < 0.5 \frac{1}{f}, f_{45} < 0$$

$$0.2 \frac{1}{f} < \left| \frac{1}{F_{23}} \right| 0.5 \frac{1}{f}, F_{23} < 0$$

wherein:
 f represents the focal length of the whole lens system;
 $r_8$ represents the radius of curvature of the intermediate cemented surface of the doublet of the fourth unit;
 $\Sigma d$ represents the total length of the whole lens system;
 $f_1$ represents the focal length of the first unit;
 $f_{45}$ represents the focal length of the fourth unit; and
 $F_{23}$ represents the focal length of an air lens formed between the second and third units ($F_{23} = N_3/\phi_{23}$, if the refractive power of the air lens is $\phi_{23}$).

The objects and features of the present invention whichare believed to be novel are set forth with particularity in the appendant claims. The present invention, both as to its organization and manner of operation, together with further objects and advantages thereof, may best be understood by reference to the following description, taken in conjunction with the accompanying drawings.

DETAILED DESCRIPTION OF THE PREFERRED EMBODIMENTS

The following description is provided to enable any person skilled in the optical art to make and use the present invention and sets forth the best modes contemplated by the inventor of carrying out his invention. Various modifications, however, will remain readily apparent to those skilled in the art, since the generic principles of the present invention have been defined herein specifically to provide a compact improved Gauss type lens system.

The derivation of the specific parameters of the lens embodiments disclosed herein can be accomplished with the assistance of a computer. The present invention represents the parameters of a compromised balance of acceptable aberrations in a relatively easily manufactured lens assembly that is particularly suited for a single lens reflex camera. The data presented herein in the tables, to be discussed subsequently, are more than adequate to permit a competent artisan in the optical art to reproduce the embodiments of the present invention. In the accompanying drawings, which supplement the following tables, the lenses in accordance with the present invention are illustrated schematically. As usual, in conventional lens diagrams, the light is assumed to travel from left to right and the individual lens units are designated by the letter, L, with a subscript indicating the position of the lenses as numbered consecutively from the object to image side.

the radius of curvature is indicated by letter, r, with a subscript corresponding to the consecutive surfaces of the lens elements from left to right. The axial spacings are designated with the letter, d, again with a subscript indicating the distance consecutively from the left to the right.

In the tables, the minus (−) signs indicate surfaces concave toward the object side, while the surfaces without a sign are convex toward the object side. The axial spacings will include both the thickness of the lens and the air spaces, and in this regard, the value of the axial spacings between the lens elements are appropriately positioned in the tables relative to the values of the radius of curvature to indicate whether the axial distance is an air space or a thickness of the lens. The tables also provide, with respect to each embodiment, the field angle 2 ω, the F number, and the focal length. The refractive index is designated as N, while the Abbe number is V.

As shown in FIGS. 1, 3, 5, 7 and 9, the present invention provides an improved Gauss type lens system of five lens units, six lens elements comprising from the object to the image side, a first group consisting of a positive meniscus single lens element ($L_1$) convex to the object side; a second unit consisting of a positive meniscus single lens element ($L_2$) convex to the object side; a third unit consisting of a negative meniscus single lens element ($L_3$) convex to the object side; a fourth unit consisting of a doublet composed of a biconcave lens element ($L_4$) and a biconvex lens element ($L_5$) cemented to the biconcave lens element at the image side thereof; and a fifth unit consisting of a positive lens element ($L_6$). The absolute value of the radius of curvature of the object side surface ($r_{10}$) of the positive lens element being greater than that of the image side surface ($r_{11}$) of the positive lens element. The lens system fulfills the following conditions:

$$0.05 \frac{1}{f} < \frac{1}{r_8} < 1.4 \frac{1}{f} \quad (1)$$

$$0.52 f < \Sigma d < 0.65 f \quad (2)$$

$$0.8 \frac{1}{f} < \frac{1}{f_1} < 1.3 \frac{1}{f} \quad (3)$$

$$0.06 \frac{1}{f} < \left| \frac{1}{f_{45}} \right| < 0.5 \frac{1}{f}, f_{45} < 0 \quad (4)$$

$$0.2 \frac{1}{f} < \left| \frac{1}{F_{23}} \right| < 0.5 \frac{1}{f}, F_{23} < 0 \quad (5)$$

wherein:
- f represents the focal length of the whole lens system;
- $r_8$ represents the radius of curvature of the intermediate cemented surface of the doublet of the fourth unit;
- $\Sigma d$ represents the total length of the whole lens system;
- $f_1$ represents the focal length of the first unit;
- $f_{45}$ represents the focal length of the fourth unit; and
- $F_{23}$ represents the focal length of an air lens formed between the second and third units ($F_{23} = N_3/\phi_{23}$, if the refractive power of the air lens if $\phi_{23}$).

Condition (1) defines the radius of curvature of the intermediate cemented surface ($r_8$) of the doublet formed by elements $L_4$ and $L_5$, the cemented surface ($r_8$) being convex to the object side since the element $L_4$ is biconcave and the element $L_5$ biconvex. When the cemented surface ($r_8$) is convex to the object side as in the present invention, the axial thickness ($d_8$) of the element $L_5$ normally increases to make the lens system bulky. According to the present invention, however, the compactness of the lens system is maintained since condition (1) defines the radius of curvature of the cemented surface ($r_8$) and the thickness ($d_8$) is decreased, with the appropriate aberration correction. Coma flare and longitudinal chromatic aberration would be generally created and the lateral chromatic aberration would be in an over corrected state if the lower limit of condition (1) is violated. On the contrary, if the upper limit of condition (1) is violated, the spherical aberration would be under corrected and the field curvature would deteriorate.

Condition (2) provides a range for the total length of the whole lens system that is possible within the restriction of condition (1). If the lower limit of condition (2) is violated, any desirable aberration correction would be impossible. On the other hand, compactness would not be attainable if the upper limit of condition (2) is violated, although the aberration correction may be easy.

Conditions (3), (4) and (5) are provided to obtain a sufficiently long back focal distance. In othe words, the refractive power of the first unit is increased to decrease the necessary diameters of the second to fifth units, and, in response thereto, a relatively great negative refractive power is distributed to the doublet of the fourth unit and the air lens formed between the second and third units. Thus, a sufficiently long back focal distance is secured. If the upper limit of condition (3) or the lower limits of condition (4) or )5) are violated, then the back focal distance would be undesirably shortened. On the other hand, the balance of aberration correction is broken due to an excessively increased Petzval Sum, if the lower limit of condition (3) or the upper limits of condition (4) or (5) are violated.

For the compactness of the lens system, it is recommended to keep the following conditions.

$$1.7 < \frac{N_1 + N_6}{2} < 1.75 \quad (6)$$

$$1.6 < N_2, N_3, N_4, N_5 < 1.7 \quad (7)$$

wherein, $N_1$, $N_2$–$N_6$ represent refractive indices of the glass material numbered from the object side, respectively.

Conditions (6) and (7) relate to the refractive indices of the glass materials used in the lens system of the present invention. These conditions insure a decrease in the spherical aberration and Petzval Sum to improve the field curvature, and for decreasing the coma flare. When condition (6) or (7) is violated, the compactness of the system would be lost since it is inevitably necessary to increase the total length of the system for decreasing the Petzval Sum. If the condition (6) and (7) are kept, it is preferable to reduce conditions (3) and (4) as follows:

$$0.9 \frac{1}{f} < \frac{1}{f_1} < 1.3 \frac{1}{f} \quad (3)'$$

$$0.09 \frac{1}{f} < \left| \frac{1}{f_{45}} \right| < 0.5 \frac{1}{f}, f_{45} < 0 \quad (4)'$$

For the correction of the distortion with other aberrations kept in good condition, it is recommended to keep the following conditions:

$$1.08 < \left| \frac{r_7}{r_6} \right| < 1.18 \quad (8)$$

$$-0.1 \frac{1}{f} < \frac{1}{r_{10}} < 0.25 \frac{1}{f} \quad (9)$$

$$0.8 \frac{1}{f} < \left| \frac{1}{r_{11}} \right| < 1.5 \frac{1}{f}, r_{11} < 0 \quad (10)$$

$$1.67 < N_1, N_2 < 1.75 \quad (11)$$

$$1.7 < N_5, N_6 < 1.79 \quad (12)$$

$$1.59 < N_3, N_4 < 1.73 \quad (13)$$

$$0.025 < \frac{1}{\nu_3}, \frac{1}{\nu_4} < 0.034 \quad (14)$$

wherein, $r_6$, $r_7$, $r_{10}$, and $r_{11}$ represent the radii of curvature of the sixth, seventh, tenth and eleventh surfaces numbered from the object side, respectively; and $\nu_3$, $\nu_4$ represent Abbe numbers of the glass material numbered from the object side, respectively. If the above conditions (8) to (14) are kept, it is preferable to reduce conditions (1) and (3) to (5) as follows:

$$0.05 \frac{1}{f} < \frac{1}{r_8} < 1.0 \frac{1}{f} \quad (1)'$$

$$0.8 \frac{1}{f} < \frac{1}{f_1} < 1.0 \frac{1}{f} \quad (3)''$$

-continued $$0.06 \frac{1}{f} < \left| \frac{1}{f_{45}} \right| < 0.2 \frac{1}{f}, f_{45} < 0 \quad (4)''$$

$$0.2 \frac{1}{f} < \left| \frac{1}{F_{23}} \right| < 0.4 \frac{1}{f}, F_{23} < 0 \quad (5)'$$

conditions (8) to (10) are for correcting distortion. If any one of the conditions (8) to (10) is violated, it is difficult to sufficiently correct distortion and some distortion would remain. For correcting distortion only, a flattened tenth surface ($r_{10}$) and an increased radius of curvature of the eleventh surface ($r_{11}$) as possible are generally favorable. However, these are limited for the purpose of total balance of the correction of various aberrations. Thus, conditions (8) to (10) are introduced for correcting distortion with other aberrations also corrected. From other point of view, conditions (8) to (10) can be determined by considering Seidel coefficients $V_6$, $V_7$, $V_{10}$ and $V_{11}$ which are coefficients of distortion with respect to sixth, seventh, tenth and eleventh surfaces ($r_6$, $r_7$, $r_{10}$ and $r_{11}$), respectively. In a case that all aberrations are sufficiently corrected, a condition, $V_6 + V_7 + V_{10} + V_{11} \leq 0.8$ is found to be favorable to reduce the negative distortion less than 1 percent in contrast to a reversed condition, $V_6 + V_7 + V_{10} + V_{11} > 0.8$, which frequently results in a negative distortion greater than 1 percent. The combination of conditions (8) to (10) are a translation from the above favorable condition of Seidel coefficients in terms of radii of curvature of the corresponding refractive surfaces.

Conditions (11) to (14) relates to the glass materials used in the lens system of the present invention. The lower limits of both conditions (11) and (12) are necessary to improve the field curvature by reducing the spherical aberration and Petzval Sum $\Sigma P$, and also to reduce coma flare. On the other hand, the upper limits of both conditions (11) and (12) means that the present invention is characterized by the use of glass materials of relatively low refractive indices. With respect to conditions (13) and (14), which are for correcting chromatic aberration by means of the third and fourth units, the correction of the longitudinal chromatic aberration would be excessive over the upper limits and insufficient under the lower limits in both conditions (13) and (14).

The following Tables 1–8 represent, respectively, the eight embodiments of the present invention.

TABLE 1

(Embodiment 1)
f = 100  $F_{No}$ = 2.0  $2\omega$ = 46°  L.B = 72.06

| Radius of Curvature | | Axial Distance | Refractive Index | Abbe Number |
|---|---|---|---|---|
| $r_1$ | 51.34 | | | |
| | | $d_1$ 7.23 | $N_1$ 1.7290 | $\nu_1$ 53.5 |
| $r_2$ | 253.55 | | | |
| | | $d_2$ 0.30 | | |
| $r_3$ | 35.71 | | | |
| | | $d_3$ 6.33 | $N_2$ 1.6584 | $\nu_2$ 50.9 |
| $r_4$ | 51.20 | | | |
| | | $d_4$ 2.59 | | |
| $r_5$ | 105.32 | | | |
| | | $d_5$ 2.37 | $N_3$ 1.6727 | $\nu_3$ 32.2 |
| $r_6$ | 26.43 | | | |
| | | $d_6$ 18.56 | | |
| $r_7$ | −31.21 | | | |
| | | $d_7$ 2.13 | $N_4$ 1.6166 | $\nu_4$ 36.7 |
| $r_8$ | 80.00 | | | |

TABLE 1-continued (Embodiment 1)

$f = 100$  $F_{No} = 2.0$  $2\omega = 46°$  L.B = 72.06

| Radius of Curvature | Axial Distance | Refractive Index | Abbe Number |
|---|---|---|---|
| | $d_8$ 8.30 | $N_5$ 1.6783 | $\nu_5$ 49.0 |
| $r_9$ −45.38 | | | |
| | $d_9$ 0.33 | | |
| $r_{10}$ −1538.39 | | | |
| | $d_{10}$ 5.00 | $N_6$ 1.7440 | $\nu_6$ 44.9 |
| $r_{11}$ −65.85 | | | |
| | $\Sigma d$ 53.14 | | |

$\dfrac{1}{f_1} = 0.01149$     $-\dfrac{1}{f_{45}} = 0.00222$ $-\dfrac{1}{F_{23}} = 0.00374$     $\dfrac{N_1 + N_6}{2} = 1.7365$

TABLE 2

(Embodiment 2)

$f = 100$  $F_{No} = 2.0$  $2\omega = 46°$  L.B = 72.01

| Radius of Curvature | Axial Distance | Refractive Index | Abbe Number |
|---|---|---|---|
| $r_1$ 51.94 | | | |
| | $d_1$ 8.50 | $N_1$ 1.7545 | $\nu_1$ 51.6 |
| $r_2$ 295.62 | | | |
| | $d_2$ 0.30 | | |
| $r_3$ 37.26 | | | |
| | $d_3$ 6.25 | $N_2$ 1.6783 | $\nu_2$ 49.0 |
| $r_4$ 51.20 | | | |
| | $d_4$ 2.45 | | |
| $r_5$ 125.00 | | | |
| | $d_5$ 2.26 | $N_3$ 1.6727 | $\nu_3$ 32.2 |
| $r_6$ 27.32 | | | |
| | $d_6$ 19.12 | | |
| $r_7$ −31.50 | | | |
| | $d_7$ 2.07 | $N_4$ 1.6166 | $\nu_4$ 36.7 |
| $r_8$ 113.83 | | | |
| | $d_8$ 9.65 | $N_5$ 1.6583 | $\nu_5$ 58.5 |
| $r_9$ −45.12 | | | |
| | $d_9$ 0.30 | | |
| $r_{10}$ 859.66 | | | |
| | $d_{10}$ 5.50 | $N_6$ 1.7015 | $\nu_6$ 41.2 |
| $r_{11}$ −67.04 | | | |
| | $\Sigma d$ 56.40 | | |

$\dfrac{1}{f_1} = 0.01215$     $-\dfrac{1}{f_{45}} = 0.00262$ $-\dfrac{1}{F_{23}} = 0.00460$     $\dfrac{N_1 + N_6}{2} = 1.72802$

TABLE 3

(Embodiment 3)

$f = 100$  $F_{No} = 2.0$  $2\omega = 46°$  L.B = 72.21

| Radius of Curvature | Axial Distance | Refractive Index | Abbe Number |
|---|---|---|---|
| $r_1$ 47.74 | | | |
| | $d_1$ 7.21 | $N_1$ 1.7290 | $\nu_1$ 53.5 |
| $r_2$ 267.03 | | | |
| | $d_2$ 0.30 | | |
| $r_3$ 37.61 | | | |
| | $d_3$ 6.30 | $N_2$ 1.6584 | $\nu_2$ 50.9 |
| $r_4$ 52.35 | | | |
| | $d_4$ 2.52 | | |
| $r_5$ 127.00 | | | |
| | $d_5$ 2.32 | $N_3$ 1.6727 | $\nu_3$ 32.2 |
| $r_6$ 26.89 | | | |
| | $d_6$ 18.53 | | |
| $r_7$ −30.03 | | | |
| | $d_7$ 2.12 | $N_4$ 1.6259 | $\nu_4$ 35.7 |
| $r_8$ 1035.05 | | | |
| | $d_8$ 8.30 | $N_5$ 1.6779 | $\nu_5$ 53.4 |
| $r_9$ −45.87 | | | |
| | $d_9$ 0.31 | | |

TABLE 3-continued (Embodiment 3)

$f = 100$  $F_{No} = 2.0$  $2\omega = 46°$  L.B = 72.21

| Radius of Curvature | Axial Distance | Refractive Index | Abbe Number |
|---|---|---|---|
| $r_{10}$ 8941.34 | | | |
| | $d_{10}$ 5.00 | $N_6$ 1.7440 | $\nu_6$ 44.9 |
| $r_{11}$ −60.75 | | | |
| | $\Sigma d$ 52.91 | | |

$\dfrac{1}{f_1} = 0.01272$     $-\dfrac{1}{f_{45}} = 0.00409$ $-\dfrac{1}{F_{23}} = 0.00425$     $\dfrac{N_1 + N_6}{2} = 1.7365$

TABLE 4

(Embodiment 4)

$f = 100$  $F_{No} = 2.0$  $2\omega = 46°$  L.B = 72.00

| Radius of Curvature | Axial Distance | Refractive Index | Abbe Number |
|---|---|---|---|
| $r_1$ 58.85 | | | |
| | $d_1$ 9.25 | $N_1$ .7495 | $\nu_1$ 50.1 |
| $r_2$ 251.49 | | | |
| | $d_2$ 0.30 | | |
| $r_3$ 39.22 | | | |
| | $d_3$ 6.36 | $N_2$ 1.6710 | $\nu_2$ 51.8 |
| $r_4$ 65.06 | | | |
| | $d_4$ 3.74 | | |
| $r_5$ 101.79 | | | |
| | $d_5$ 2.56 | $N_3$ 1.6727 | $\nu_3$ 32.2 |
| $r_6$ 26.07 | | | |
| | $d_6$ 22.80 | | |
| $r_7$ −29.60 | | | |
| | $d_7$ 2.04 | $N_4$ 1.6057 | $\nu_4$ 37.8 |
| $r_8$ 75.16 | | | |
| | $d_8$ 11.19 | $N_5$ 1.6583 | $\nu_5$ 58.5 |
| $r_9$ −40.55 | | | |
| | $d_9$ 0.30 | | |
| $r_{10}$ 3667.44 | | | |
| | $d_{10}$ 6.43 | $N_6$ 1.7352 | $\nu_6$ 40.9 |
| $r_{11}$ −71.02 | | | |
| | $\Sigma d$ 64.97 | | |

$\dfrac{1}{f_1} = 0.00996$     $-\dfrac{1}{f_{45}}\ 0.00092$ $-\dfrac{1}{F_{23}} = 0.00206$     $\dfrac{N_1 + N_6}{2} = 1.74235$

TABLE 5

(Embodiment 5)

$f = 100$  $F_{No} = 2.0$  $2\omega = 46°$  L.B. = 72.01

| Radius of Curvature | Axial Distance | Refractive Index | Abbe Number |
|---|---|---|---|
| $r_1$ 73.73 | | | |
| | $d_1$ 8.03 | $N_1$ 1.7200 | $\nu_1$ 50.3 |
| $r_2$ 560.82 | | | |
| | $d_2$ 0.32 | | |
| $r_3$ 39.32 | | | |
| | $d_3$ 8.59 | $N_2$ 1.7200 | $\nu_2$ 50.3 |
| $r_4$ 66.67 | | | |
| | $d_4$ 1.90 | | |
| $r_5$ 109.93 | | | |
| | $d_5$ 3.06 | $N_3$ 1.6830 | $\nu_3$ 32.1 |
| $r_6$ 28.48 | | | |
| | $d_6$ 22.71 | | |
| $r_7$ −31.97 | | | |
| | $d_7$ 4.36 | $N_4$ 1.6545 | $\nu_4$ 33.9 |
| $r_8$ 326.53 | | | |
| | $d_8$ 8.80 | $N_5$ 1.7200 | $\nu_5$ 52.1 |
| $r_9$ −42.70 | | | |
| | $d_9$ 0.32 | | |
| $r_{10}$ ∞ | | | |
| | $d_{10}$ 5.71 | $N_6$ 1.7440 | $\nu_6$ 44.9 |
| $r_{11}$ −76.60 | | | |

TABLE 5-continued (Embodiment 5)
f = 100   $F_{No} = 2.0$   $2\omega = 46°$   L.B. = 72.01

| Radius of Curvature | Axial Distance | Refractive Index | Abbe Number |
|---|---|---|---|
| | Σd  63.80 | | |

$$\frac{1}{f_1} = 0.00854 \qquad -\frac{1}{f_{45}} = 0.00074$$

$$-\frac{1}{F_{23}} = 0.00265 \qquad \frac{N_1 + N_6}{2} = 1.732$$

TABLE 6

(Embodiment 6)
f = 100   $F_{No} = 2.0$   $2\omega = 46°$   L.B. = 71.90

| Radius of Curvature | Axial Distance | Refractive Index | Abbe Number |
|---|---|---|---|
| $r_1$  73.07 | | | |
| | $d_1$  7.98 | $N_1$ 1.7200 | $\nu_1$ 50.3 |
| $r_2$  557.50 | | | |
| | $d_2$  0.31 | | |
| $r_3$  39.19 | | | |
| | $d_3$  8.70 | $N_2$ 1.7200 | $\nu_2$ 50.3 |
| $r_4$  65.35 | | | |
| | $d_4$  1.75 | | |
| $r_5$  109.30 | | | |
| | $d_5$  3.09 | $N_3$ 1.6830 | $\nu_3$ 32.1 |
| $r_6$  28.45 | | | |
| | $d_6$  22.64 | | |
| $r_7$  −31.83 | | | |
| | $d_7$  4.17 | $N_4$ 1.6545 | $\nu_4$ 33.9 |
| $r_8$  316.75 | | | |
| | $d_8$  8.76 | $N_5$ 1.7200 | $\nu_5$ 52.1 |
| $r_9$  −42.29 | | | |
| | $d_9$  0.31 | | |
| $r_{10}$  ∞ | | | |
| | $d_{10}$  5.69 | $N_6$ 1.7440 | $\nu_6$ 44.9 |
| $r_{11}$  −77.02 | | | |
| | Σd  63.40 | | |

$$\frac{1}{f_1} = 0.00862 \qquad -\frac{1}{f_{45}} = 0.00067$$

$$-\frac{1}{F_{23}} = 0.00276 \qquad \frac{N_1 + N_6}{2} = 1.732$$

TABLE 7

(Embodiment 7)
f = 100   $F_{No} = 2.0$   $2\omega = 46°$   L.B. = 71.96

| Radius of Curvature | Axial Distance | Refractive Index | Abbe Number |
|---|---|---|---|
| $r_1$  73.11 | | | |
| | $d_1$  7.99 | $N_1$ 1.7200 | $\nu_1$ 50.3 |
| $r_2$  551.78 | | | |
| | $d_2$  0.31 | | |
| $r_3$  39.19 | | | |
| | $d_3$  8.71 | $N_2$ 1.7200 | $\nu_2$ 50.3 |
| $r_4$  65.38 | | | |
| | $d_4$  1.75 | | |
| $r_5$  108.94 | | | |
| | $d_5$  3.08 | $N_3$ 1.6830 | $\nu_3$ 32.1 |
| $r_6$  28.44 | | | |
| | $d_6$  22.63 | | |
| $r_7$  −31.84 | | | |
| | $d_7$  4.18 | $N_4$ 1.6545 | $\nu_4$ 33.9 |
| $r_8$  316.62 | | | |
| | $d_8$  8.76 | $N_5$ 1.7200 | $\nu_5$ 52.1 |
| $r_9$  −42.36 | | | |
| | $d_9$  0.31 | | |
| $r_{10}$  ∞ | | | |
| | $d_{10}$  5.69 | $N_6$ 1.7440 | $\nu_6$ 44.9 |
| $r_{11}$  −76.86 | | | |
| | Σd  63.41 | | |

$$\frac{1}{f_1} = 0.0086 \qquad -\frac{1}{f_{45}} = 0.0007$$

$$-\frac{1}{F_{23}} = 0.00275 \qquad \frac{N_1 + N_6}{2} = 1.732$$

TABLE 8

(Embodiment 8)
f = 100   $F_{No} = 2.0$   $2\omega = 46°$   L.B. = 72.04

| Radius of Curvature | Axial Distance | Refractive Index | Abbe Number |
|---|---|---|---|
| $r_1$  68.36 | | | |
| | $d_1$  8.00 | $N_1$ 1.7200 | $\nu_1$ 50.3 |
| $r_2$  447.66 | | | |
| | $d_2$  0.31 | | |
| $r_3$  39.60 | | | |
| | $d_3$  8.60 | $N_2$ 1.7200 | $\nu_2$ 50.3 |
| $r_4$  64.10 | | | |
| | $d_4$  1.75 | | |
| $r_5$  105.17 | | | |
| | $d_5$  3.11 | $N_3$ 1.6830 | $\nu_3$ 32.1 |
| $r_6$  28.13 | | | |
| | $d_6$  22.34 | | |
| $r_7$  −31.44 | | | |
| | $d_7$  4.33 | $N_4$ 1.6545 | $\nu_4$ 33.9 |
| $r_8$  309.37 | | | |
| | $d_8$  8.82 | $N_5$ 1.6935 | $\nu_5$ 53.4 |
| $r_9$  −42.82 | | | |
| | $d_9$  0.31 | | |
| $r_{10}$  ∞ | | | |
| | $d_{10}$  5.71 | $N_6$ 1.7440 | $\nu_6$ 44.9 |
| $r_{11}$  −69.83 | | | |
| | Σd  63.28 | | |

$$\frac{1}{f_1} = 0.009 \qquad -\frac{1}{f_{45}} = 0.00186$$

$$-\frac{1}{F_{23}} = 0.00274 \qquad \frac{N_1 + N_6}{2} = 1.732$$

Figure 1:
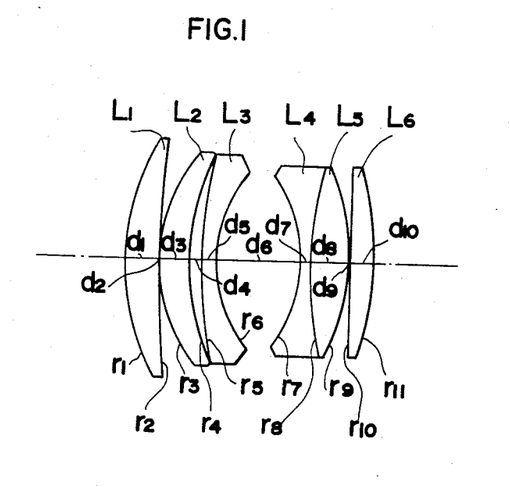
FIG. 1 represents a schematic cross sectional view of a first embodiment of the present invention.
Figure 2A:
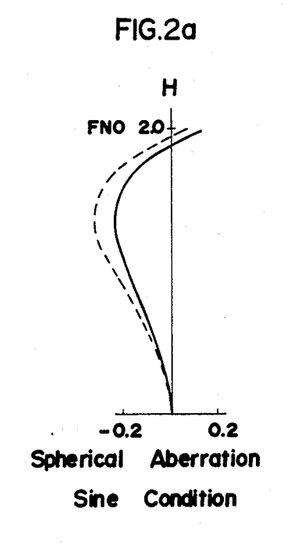
FIGS. 2a, 2b and 2c represent graphic plots of the aberrations of the first embodiment.
Figure 2B:
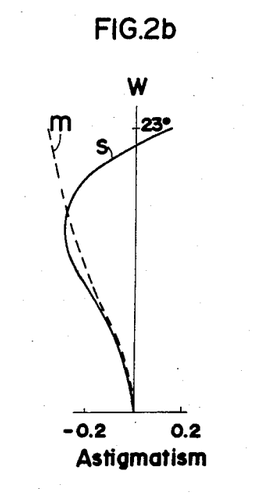
Figure 2C:
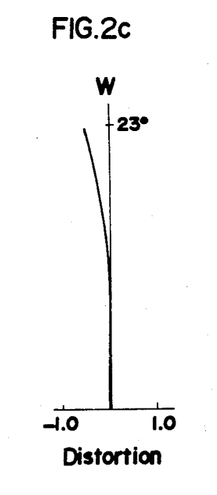
Figure 3:
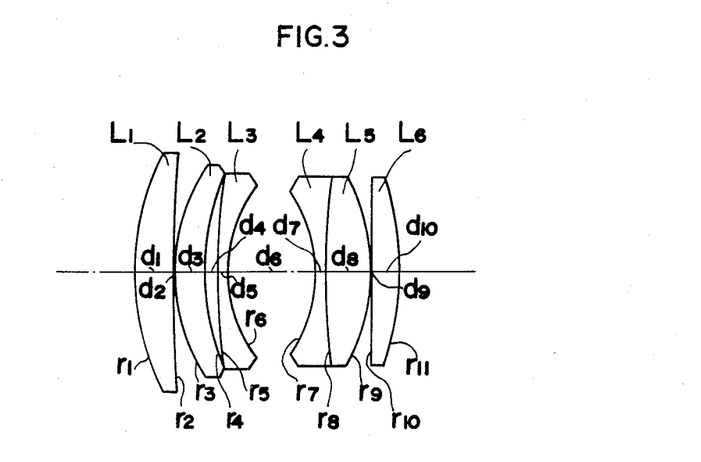
FIG. 3 represents a schematic cross sectional view of a second embodiment of the present invention.
Figure 4A:
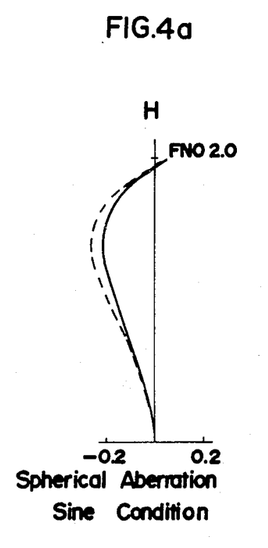
FIGS. 4a, 4b and 4c represent graphic plots of the aberrations of the second embodiment.
Figure 4B:
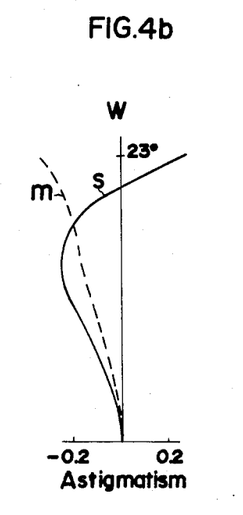
Figure 4C:
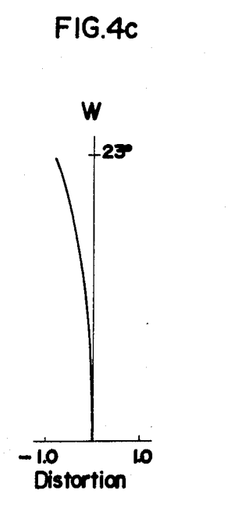
Figure 5:
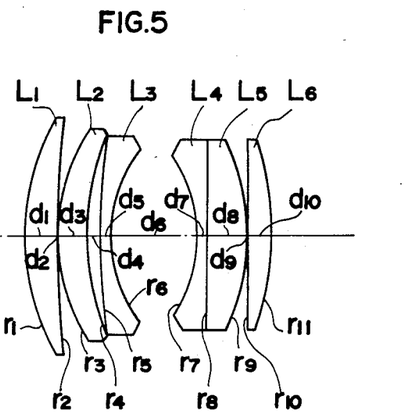
FIG. 5 represents a schematic cross sectional view of a third embodiment of the present invention.
Figure 6A:
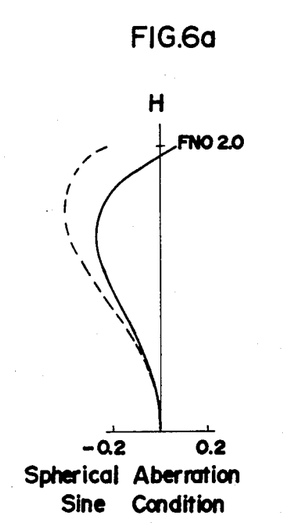
FIGS. 6a, 6b and 6c represent graphic plots of the aberrations of the third embodiment.
Figure 6B:
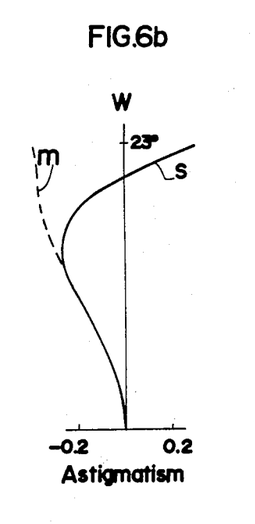
Figure 6C:
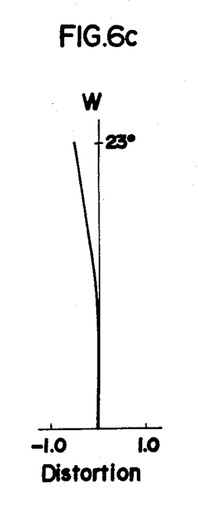
Figure 7:
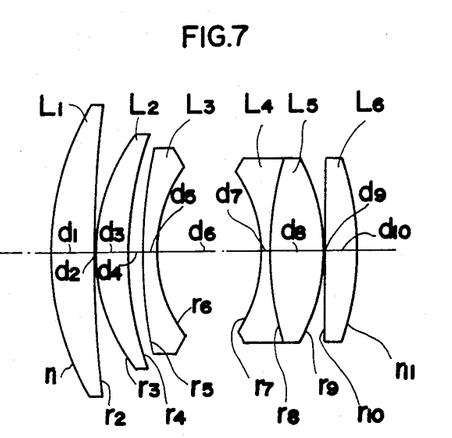
FIG. 7 represents a schematic cross sectional view of a fourth embodiment of the present invention.
Figure 8A:
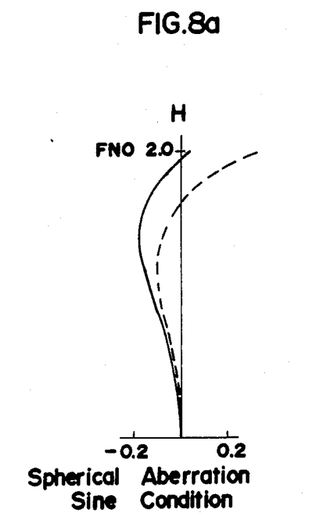
FIGS. 8a, 8b and 8c represent graphic plots of the aberrations of the fourth embodiment.
Figure 8B:
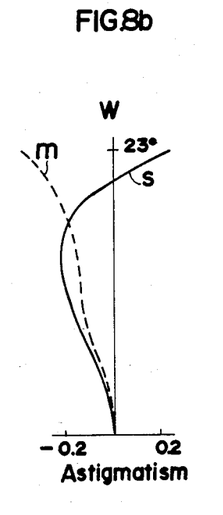
Figure 8C:
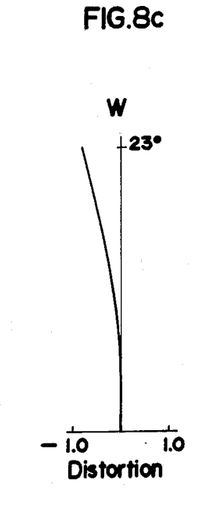
Figure 9:
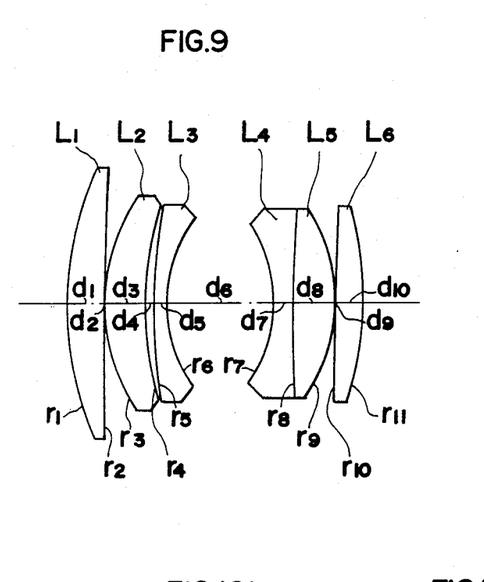
FIG. 9 represents a schematic cross sectional view common to a fifth to eighth embodiments of the present invention.
Figure 10A:
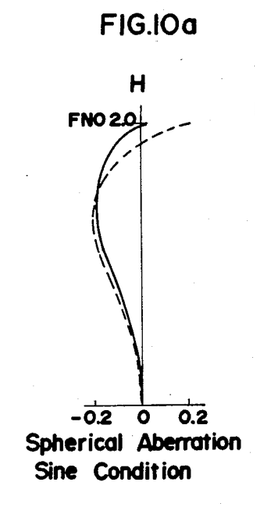
FIGS. 10a, 10b and 10c represent graphic plots of the aberrations of the fifth embodiment.
Figure 10B:
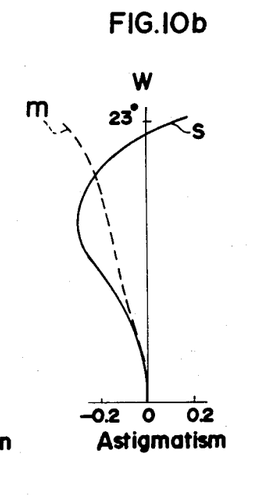
Figure 10C:
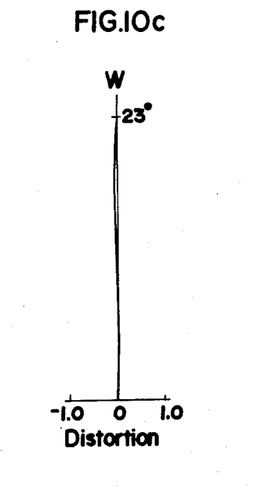
Figure 11A:
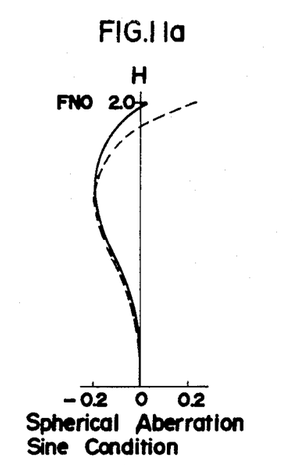
FIGS. 11a, 11b and 11c represent graphic plots of the aberrations of the sixth embodiment.
Figure 11B:
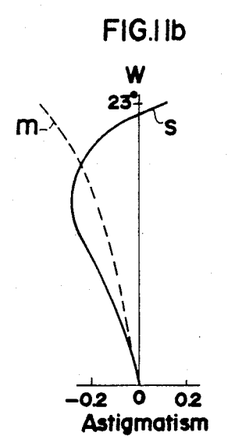
Figure 11C:
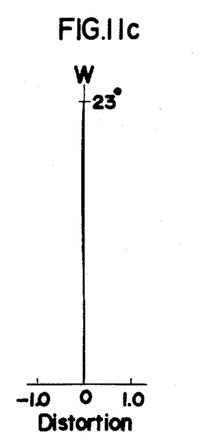
Figure 12A:
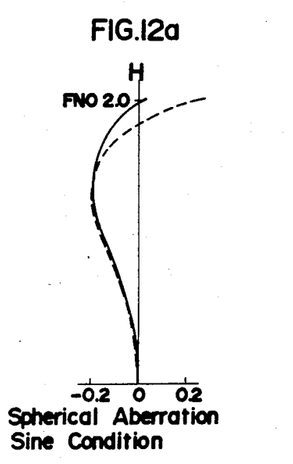
FIGS. 12a, 12b and 12c represent graphic plots of the aberrations of the seventh embodiment.
Figure 12B:
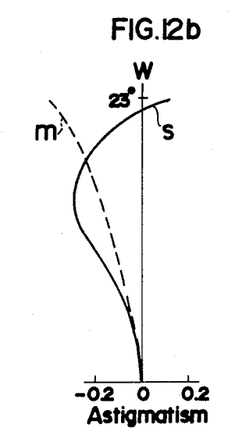
Figure 12C:
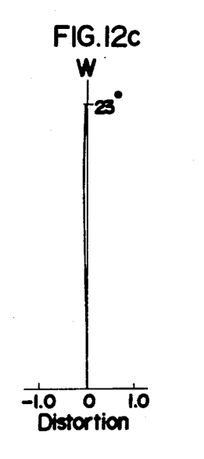
Figure 13A:
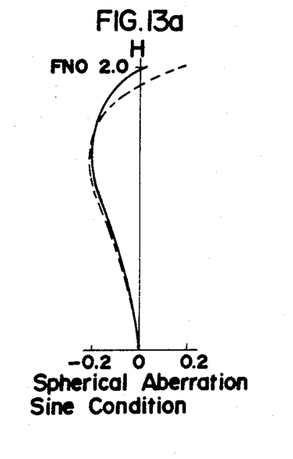
FIGS. 13a, 13b and 13c represent graphic plots of the aberrations of the eighth embodiment.
Figure 13B:
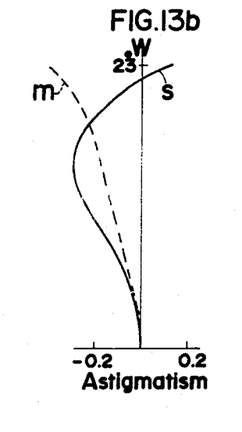
Figure 13C:
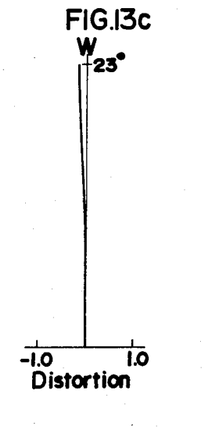

FIGS. 2a, 2b and 2c are graphical plots of spherical aberration, astigmatism and distortion of the first embodiment of FIG. 1; FIGS. 4a, 4b and 4c disclose the aberration plots for FIG. 3. FIGS. 6a, 6b and 6c disclose the aberration plots for FIG. 5 while FIGS. 8a, 8b and 8c disclose the aberration plots for FIG. 7. FIGS. 10a, 10b and 10c; 11a, 11b and 11c; 12a, 12b and 12c; and 13a, 13b and 13c disclose the aberration plots for the fifth to eighth embodiments which are commonly shown in FIG. 9.

While the above embodiments have been disclosed as the best modes presently contemplated by the inventor, it should be realized that these examples should not be interpreted as limiting, because artisans skilled in this field, once given the present teachings, can vary from these specific embodiments. Accordingly, the scope of the present invention should be determined from the following claims,

What is claimed is:

1. A modified Gauss type lens system of five units six-elements comprising from the object to the image side:

a first unit consisting of a positive meniscus single lens element convex to the object side;

a second unit consisting of a positive meniscus single lens element convex to the object side;

a third unit consisting of a negative meniscus single lens element convex to the object side;

a fourth unit consisting of a doublet composed of a biconcave lens element and a biconvex lens element cemented to the biconcave lens element at the image side thereof; and a fifth unit consisting of a positive lens element, the absolute value of the radius of curvature of the object side surface of the positive lens element being greater than that of the image side surface of the positive lens element, wherein the lens system fulfills the following conditions:

$$0.05 \frac{1}{f} < \frac{1}{r_8} < 1.4 \frac{1}{f} \quad (1)$$

$$0.52 f < \Sigma d < 0.65 f \quad (2)$$

$$0.9 \frac{1}{f} < \frac{1}{f_1} < 1.3 \frac{1}{f} \quad (3)$$

$$0.09 \frac{1}{f} < \left| \frac{1}{f_{45}} \right| < 0.5 \frac{1}{f}, f_{45} < 0 \quad (4)$$

$$0.2 \frac{1}{f} < \left| \frac{1}{F_{23}} \right| < 0.5 \frac{1}{f}, F_{23} < 0 \quad (5)$$

$$1.7 < \frac{N_1 + N_6}{2} < 1.75 \quad (6)$$

$$1.6 < N_2, N_3, N_4, N_5 < 1.7 \quad (7)$$

wherein f represents the focal length of the whole lens system;

$r_8$ represents the radius of curvature of the intermediate cemented surface of the doublet of the fourth unit;

$\Sigma d$ represents the total length of the whole lens system;

$f_1$ represents the focal length of the first unit;

$f_{45}$ represents the focal length of the fourth unit;

$F_{23}$ represents the focal length of an air lens formed between the second and third units ($F_{23} = N_3/\phi_{23}$, if the refractive power of the air lens is $\phi_{23}$); and $N_1$ represents the refractive indices of the glass materials numbered consecutively from the object side.

2. A modified Gauss type lens system of five-units, six-elements comprising from the object to the image side:

a first unit consisting of a positive meniscus single lens element convex to the object side;

a second unit consisting of a positive meniscus single lens element convex to the object side;

a thid unit consisting of a negative meniscus single lens element convex to the object side;

a fourth unit consisting of a doublet composed of a biconcave lens element and a biconvex lens element cemented to the biconcave lens element at the image side thereof; and a fifth unit consisting of a positive lens element, the absolute value of the radius of curvature of the object side surface of the positive lens element being greater than that of the image side surface of the positive lens element, wherein the lens system fulfills the following conditions:

$$-0.05 \frac{1}{f} < \frac{1}{r_8} < 1.0 \frac{1}{f}$$

$$0.8 \frac{1}{f} < \frac{1}{f_1} < 1.0 \frac{1}{f}$$

$$0.06 \frac{1}{f} < \left| \frac{1}{f_{45}} \right| < 0.2 \frac{1}{f}, f_{45} < 0$$

$$0.2 \frac{1}{f} < \left| \frac{1}{F_{23}} \right| < 0.4 \frac{1}{f}, F_{23} < 0$$

$$1.08 < \left| \frac{r_7}{r_6} \right| < 1.18$$

$$-0.1 \frac{1}{f} < \frac{1}{r_{10}} < 0.25 \frac{1}{f}$$

$$0.8 \frac{1}{f} < \left| \frac{1}{r_{11}} \right| < 1.5 \frac{1}{f}, r_{11} < 0$$

$$1.67 < N_1, N_2 < 1.75$$
$$1.7 < N_5, N_6 < 1.79$$
$$1.59 < N_3, N_4 < 1.73$$

$$0.025 < \frac{1}{\nu_3}, \frac{1}{\nu_4} < 0.034$$

wherein:

f represents the focal length of the whole lens system;

$r_6, r_7, r_8, r_{10}$ and $r_{11}$ represent radii of curvature of the sixth, seventh, eighth, tenth and eleventh surfaces numbered from the object side, respectively;

$f_1$ represents the focal length of the first unit;

$f_{45}$ represents the focal length of the fourth unit;

$F_{23}$ represents the focal length of an air lens formed between the second and third units ($F_{23} = N_3/\phi_{23}$, if the refractive power of the air lens is $\phi_{23}$);

$N_1, N_2, \ldots, N_6$ represent refractive indices of the glass materials numbered from the object side, respectively; and $\nu_3, \nu_4$ represent Abbe numbers of the glass materials numbered from the object side, respectively.

3. A modified Gauss type lens system of a five-units, six-elements type comprising from the object to the image side:

a first unit consisting of a positive meniscus single lens element convex to the object side;

a second unit consisting of a positive meniscus single lens element convex to the object side;

a third unit consisting of a negative meniscus single lens element convex to the object side;

a fourth unit consisting of a doublet composed of a biconcave lens element and a biconvex lens element cemented to the biconcave lens element at the image side thereof, and a fifth unit consisting of a positive lens element, the absolute value of the radius of curvature of the object side surface of the positive lens element being greater than that of the image side surface of the positive lens element, wherein the lens system fulfills the following conditions:

$$0.05 \frac{1}{f} < \frac{1}{r_8} < 1.4 \frac{1}{f}$$

$$0.52 f < \Sigma d < 0.65 f$$

-continued $$0.9\frac{1}{f} < \frac{1}{f_1} < 1.3\frac{1}{f}$$

wherein:
f represents the focal length of the whole lens system;
$f_8$ represents the radius of curvature of the intermediate cemented surface of the doublet of the fourth unit;
d represents the total length of the whole lens system, and
$f_1$ represents the focal length of the first unit.

4. A modified Gauss type lens system of a five-units six-elements type comprising from the object to the image side:
a first unit consisting of a positive meniscus single lens element convex to the object side;
a second unit consisting of a positive meniscus single lens element convex to the object side;
a third unit consisting of a negative meniscus single lens element convex to the object side;
a fourth unit of a negative refractive power consisting of a doublet composed of a biconcave lens element and a biconvex lens element cemented to the biconcave lens element at the image side thereof, and
a fifth unit consisting of a positive lens element, the absolute value of the radius of curvature of the object side surface of the positive lens element being greater than that of the image side surface of the positive lens element, wherein the lens system fulfills the following conditions:

$$-0.2\frac{1}{f} < \frac{1}{f_{45}} < -0.06\frac{1}{f}$$

$$1.08 < \left|\frac{r_7}{r_6}\right| < 1.18$$

$$-0.1\frac{1}{f} < \frac{1}{r_{10}} < 0.25\frac{1}{f}$$

$$1.67 < N_1 < 1.75$$

wherein:
f represents the focal length of the whole lens system;
$f_{45}$ represents the focal length of the fourth unit;
$r_6$, $r_7$ and $r_{10}$ represent radii of curvature of the sixth, seventh, and tenth surfaces numbered from the object side, respectively, and
$N_1$ represents the refractive index of the glass material of the first unit.

5. The invention of claim 4, wherein the intermediate cemented surface of the doublet in the fourth unit has a positive refractive power.

6. A modified Gauss type lens system comprising the following design parameters:

| f = 100 | $F_{No}$ = 2.0 | 2ω = 46° | L. B. = 72.06 | |
|---|---|---|---|---|
| Radius of Curvature | | Axial Distance | Refractive Index | Abbe Number |
| $r_1$ | 51.34 | | | |
| | | $d_1$ 7.23 | $N_1$ 1.7290 | $\nu_1$ 53.5 |
| $r_2$ | 253.55 | | | |
| | | $d_2$ 0.30 | | |
| $r_3$ | 35.71 | | | |
| | | $d_3$ 6.33 | $N_2$ 1.6584 | $\nu_2$ 50.9 |
| $r_4$ | 51.20 | | | |
| | | $d_4$ 2.59 | | |
| $r_5$ | 105.32 | | | |
| | | $d_5$ 2.37 | $N_3$ 1.6727 | $\nu_3$ 32.2 |
| $r_6$ | 26.43 | | | |
| | | $d_6$ 18.56 | | |
| $r_7$ | −31.21 | | | |
| | | $d_7$ 2.13 | $N_4$ 1.6166 | $\nu_4$ 36.7 |
| $r_8$ | 80.00 | | | |
| | | $d_8$ 8.30 | $N_5$ 1.6783 | $\nu_5$ 49.0 |
| $r_9$ | −45.38 | | | |
| | | $d_9$ 0.33 | | |
| $r_{10}$ | −1538.39 | | | |
| | | $d_{10}$ 5.00 | $N_6$ 1.7440 | $\nu_6$ 44.9 |
| $r_{11}$ | −65.85 | | | |
| Σd | 53.14 | | | |

$$\frac{1}{f_1} = 0.01149 \qquad -\frac{1}{f_{45}} = 0.00222$$

$$-\frac{1}{F_{23}} = 0.00374 \qquad \frac{N_1 + N_6}{2} = 1.7365$$

7. A modified Gauss type lens system comprising the following design parameters:

| f = 100 | $F_{No}$ = 2.0 | 2ω = 46° | L. B. = 72.01 | |
|---|---|---|---|---|
| Radius of Curvature | | Axial Distance | Refractive Index | Abbe Number |
| $r_1$ | 51.94 | | | |
| | | $d_1$ 8.50 | $N_1$ 1.7545 | $\nu_1$ 51.6 |
| $r_2$ | 295.62 | | | |
| | | $d_2$ 0.30 | | |
| $r_3$ | 37.26 | | | |
| | | $d_3$ 6.25 | $N_2$ 1.6783 | $\nu_2$ 49.0 |
| $r_4$ | 51.20 | | | |
| | | $d_4$ 2.45 | | |
| $r_5$ | 125.00 | | | |
| | | $d_5$ 2.26 | $N_3$ 1.6727 | $\nu_3$ 32.2 |
| $r_6$ | 27.32 | | | |
| | | $d_6$ 19.12 | | |
| $r_7$ | −31.50 | | | |
| | | $d_7$ 2.07 | $N_4$ 1.6166 | $\nu_4$ 36.7 |
| $r_8$ | 113.83 | | | |
| | | $d_8$ 9.65 | $N_5$ 1.6583 | $\nu_5$ 58.5 |
| $r_9$ | −45.12 | | | |
| | | $d_9$ 0.30 | | |
| $r_{10}$ | 859.66 | | | |
| | | $d_{10}$ 5.50 | $N_6$ 1.7015 | $\nu_6$ 41.2 |
| $r_{11}$ | −67.04 | | | |
| Σd | 56.40 | | | |

$$\frac{1}{f_1} = 0.01215 \qquad -\frac{1}{f_{45}} = 0.00262$$

$$-\frac{1}{F_{23}} = 0.00460 \qquad \frac{N_1 + N_6}{2} = 1.72802$$

8. A modified Gauss type lens system comprising the following design parameters:

| f = 100 | $F_{No}$ = 2.0 | 2ω = 46° | L. B. = 72.21 | |
|---|---|---|---|---|
| Radius of Curvature | | Axial Distance | Refractive Index | Abbe Number |
| $r_1$ | 47.74 | | | |
| | | $d_1$ 7.21 | $N_1$ 1.7290 | $\nu_1$ 53.5 |
| $r_2$ | 267.03 | | | |
| | | $d_2$ 0.30 | | |
| $r_3$ | 37.61 | | | |
| | | $d_3$ 6.30 | $N_2$ 1.6584 | $\nu_2$ 50.9 |
| $r_4$ | 52.35 | | | |
| | | $d_4$ 2.52 | | |
| $r_5$ | 127.00 | | | |

-continued

| | $f = 100$ | $F_{No} = 2.0$ | $2\omega = 46°$ | L. B. = 72.21 |
|---|---|---|---|---|
| | Radius of Curvature | Axial Distance | Refractive Index | Abbe Number |
| | | $d_5$ 2.32 | $N_3$ 1.6727 | $\nu_3$ 32.2 |
| $r_6$ | 26.89 | | | |
| | | $d_6$ 18.53 | | |
| $r_7$ | −30.03 | | | |
| | | $d_7$ 2.12 | $N_4$ 1.6259 | $\nu_4$ 35.7 |
| $r_8$ | 1035.05 | | | |
| | | $d_8$ 8.30 | $N_5$ 1.6779 | $\nu_5$ 53.4 |
| $r_9$ | −45.87 | | | |
| | | $d_9$ 0.31 | | |
| $r_{10}$ | 8941.34 | | | |
| | | $d_{10}$ 5.00 | $N_6$ 1.7440 | $\nu_6$ 44.9 |
| $r_{11}$ | −60.75 | | | |
| | | $\Sigma d$ 52.91 | | |

$$\frac{1}{f_1} = 0.01272 \qquad -\frac{1}{f_{45}} = 0.00409$$

$$-\frac{1}{F_{23}} = 0.00425 \qquad \frac{N_1 + N_6}{2} = 1.7365$$

9. A modified Gauss type lens system comprising the following design parameters:

| | $f = 100$ | $F_{No} = 2.0$ | $2\omega = 46°$ | L. B. = 72.00 |
|---|---|---|---|---|
| | Radius of Curvature | Axial Distance | Refractive Index | Abbe Number |
| $r_1$ | 58.85 | | | |
| | | $d_1$ 9.25 | $N_1$ 1.7495 | $\nu_1$ 50.1 |
| $r_2$ | 251.49 | | | |
| | | $d_2$ 0.30 | | |
| $r_3$ | 39.22 | | | |
| | | $d_3$ 6.36 | $N_2$ 1.6710 | $\nu_2$ 51.8 |
| $r_4$ | 65.06 | | | |
| | | $d_4$ 3.74 | | |
| $r_5$ | 101.79 | | | |
| | | $d_5$ 2.56 | $N_3$ 1.6727 | $\nu_3$ 32.2 |
| $r_6$ | 26.07 | | | |
| | | $d_6$ 22.80 | | |
| $r_7$ | −29.60 | | | |
| | | $d_7$ 2.04 | $N_4$ 1.6057 | $\nu_4$ 37.8 |
| $r_8$ | 75.16 | | | |
| | | $d_8$ 11.19 | $N_5$ 1.6583 | $\nu_5$ 58.5 |
| $r_9$ | −40.55 | | | |
| | | $d_9$ 0.30 | | |
| $r_{10}$ | 3667.44 | | | |
| | | $d_{10}$ 6.43 | $N_6$ 1.7352 | $\nu_6$ 40.9 |
| $r_{11}$ | −71.02 | | | |
| | | $\Sigma d$ 64.97 | | |

$$\frac{1}{f_1} = 0.00996 \qquad -\frac{1}{f_{45}} = 0.00092$$

$$-\frac{1}{F_{23}} = 0.00206 \qquad \frac{N_1 + N_6}{2} = 1.74235$$

10. A modified Gauss type lens system comprising the following design parameters:

| | $f = 100$ | $F_{No} = 2.0$ | $2\omega = 46°$ | L. B. = 72.01 |
|---|---|---|---|---|
| | Radius of Curvature | Axial Distance | Refractive Index | Abbe Number |
| $r_1$ | 73.73 | | | |
| | | $d_1$ 8.03 | $N_1$ 1.7200 | $\nu_1$ 50.3 |
| $r_2$ | 560.82 | | | |
| | | $d_2$ 0.32 | | |
| $r_3$ | 39.32 | | | |
| | | $d_3$ 8.59 | $N_2$ 1.7200 | $\nu_2$ 50.3 |
| $r_4$ | 66.67 | | | |
| | | $d_4$ 1.90 | | |
| $r_5$ | 109.93 | | | |
| | | $d_5$ 3.06 | $N_3$ 1.6830 | $\nu_3$ 32.1 |
| $r_6$ | 28.48 | | | |
| | | $d_6$ 22.71 | | |
| $r_7$ | −31.97 | | | |
| | | $d_7$ 4.36 | $N_4$ 1.6545 | $\nu_4$ 33.9 |
| $r_8$ | 326.53 | | | |
| | | $d_8$ 8.80 | $N_5$ 1.7200 | $\nu_5$ 52.1 |
| $r_9$ | −42.70 | | | |
| | | $d_9$ 0.32 | | |
| $r_{10}$ | ∞ | | | |
| | | $d_{10}$ 5.71 | $N_6$ 1.7440 | $\nu_6$ 44.9 |
| $r_{11}$ | −76.60 | | | |
| | | $\Sigma d$ 63.80 | | |

$$\frac{1}{f_1} = 0.00854 \qquad -\frac{1}{f_{45}} = 0.00074$$

$$-\frac{1}{F_{23}} = 0.00265 \qquad \frac{N_1 + N_6}{2} = 1.732$$

11. A modified Gauss type lens system comprising the following design parameters:

| | $f = 100$ | $F_{No} = 2.0$ | $2\omega = 46°$ | L. B. = 71.90 |
|---|---|---|---|---|
| | Radius of Curvature | Axial Distance | Refractive Index | Abbe Number |
| $r_1$ | 73.07 | | | |
| | | $d_1$ 7.98 | $N_1$ 1.7200 | $\nu_1$ 50.3 |
| $r_2$ | 557.50 | | | |
| | | $d_2$ 0.31 | | |
| $r_3$ | 39.19 | | | |
| | | $d_3$ 8.70 | $N_2$ 1.7200 | $\nu_2$ 50.3 |
| $r_4$ | 65.35 | | | |
| | | $d_4$ 1.75 | | |
| $r_5$ | 109.30 | | | |
| | | $d_5$ 3.09 | $N_3$ 1.6830 | $\nu_3$ 32.1 |
| $r_6$ | 28.45 | | | |
| | | $d_6$ 22.64 | | |
| $r_7$ | −31.83 | | | |
| | | $d_7$ 4.17 | $N_4$ 1.6545 | $\nu_4$ 33.9 |
| $r_8$ | 316.75 | | | |
| | | $d_8$ 8.76 | $N_5$ 1.7200 | $\nu_5$ 52.1 |
| $r_9$ | −42.29 | | | |
| | | $d_9$ 0.31 | | |
| $r_{10}$ | ∞ | | | |
| | | $d_{10}$ 5.69 | $N_6$ 1.7440 | $\nu_6$ 44.9 |
| $r_{11}$ | −77.02 | | | |
| | | $\Sigma d$ 63.40 | | |

$$\frac{1}{f_1} = 0.00862 \qquad -\frac{1}{f_{45}} = 0.00067$$

$$-\frac{1}{F_{23}} = 0.00276 \qquad \frac{N_1 + N_6}{2} = 1.732$$

12. A modified Gauss type lens system comprising the following design parameters:

| | $f = 100$ | $F_{No} = 2.0$ | $2\omega = 46°$ | L. B. = 71.96 |
|---|---|---|---|---|
| | Radius of Curvature | Axial Distance | Refractive Index | Abbe Number |
| $r_1$ | 73.11 | | | |
| | | $d_1$ 7.99 | $N_1$ 1.7200 | $\nu_1$ 50.3 |
| $r_2$ | 551.78 | | | |
| | | $d_2$ 0.31 | | |
| $r_3$ | 39.19 | | | |
| | | $d_3$ 8.71 | $N_2$ 1.7200 | $\nu_2$ 50.3 |
| $r_4$ | 65.38 | | | |
| | | $d_4$ 1.75 | | |
| $r_5$ | 108.94 | | | |
| | | $d_5$ 3.08 | $N_3$ 1.6830 | $\nu_3$ 32.1 |
| $r_6$ | 28.44 | | | |

-continued

| | f = 100 | $F_{No}$ = 2.0 | 2ω = 46° | L. B. = 71.96 |
|---|---|---|---|---|
| | Radius of Curvature | Axial Distance | Refractive Index | Abbe Number |
| | | $d_6$ 22.63 | | |
| $r_7$ | −31.84 | | | |
| | | $d_7$ 4.18 | $N_4$ 1.6545 | $\nu_4$ 33.9 |
| $r_8$ | 316.62 | | | |
| | | $d_8$ 8.76 | $N_5$ 1.7200 | $\nu_5$ 52.1 |
| $r_9$ | −42.36 | | | |
| | | $d_9$ 0.31 | | |
| $r_{10}$ | ∞ | | | |
| | | $d_{10}$ 5.69 | $N_6$ 1.7440 | $\nu_6$ 44.9 |
| $r_{11}$ | −76.86 | | | |
| | | Σd 63.41 | | |

$$\frac{1}{f_1} = 0.0086 \qquad -\frac{1}{f_{45}} = 0.0007$$

$$-\frac{1}{F_{23}} = 0.00275 \qquad \frac{N_1 + N_6}{2} = 1.732$$

13. A modified Gauss type lens system comprising the following design parameters:

| f = 100 | $F_{No}$ = 2.0 | 2ω = 46° | L. B. = 72.04 |
|---|---|---|---|
| Radius of Curvature | Axial Distance | Refractive Index | Abbe Number |
| $r_1$ 68.36 | | | |
| | $d_1$ 8.00 | $N_1$ 1.7200 | $\nu_1$ 50.3 |
| $r_2$ 447.66 | | | |
| | $d_2$ 0.31 | | |
| $r_3$ 39.60 | | | |
| | $d_3$ 8.60 | $N_2$ 1.7200 | $\nu_2$ 50.3 |
| $r_4$ 64.10 | | | |
| | $d_4$ 1.75 | | |
| $r_5$ 105.17 | | | |
| | $d_5$ 3.11 | $N_3$ 1.6830 | $\nu_3$ 32.1 |
| $r_6$ 28.13 | | | |
| | $d_6$ 22.34 | | |
| $r_7$ −31.44 | | | |
| | $d_7$ 4.33 | $N_4$ 1.6545 | $\nu_4$ 33.9 |
| $r_8$ 309.37 | | | |
| | $d_8$ 8.82 | $N_5$ 1.6935 | $\nu_5$ 53.4 |
| $r_9$ −42.82 | | | |
| | $d_9$ 0.31 | | |
| $r_{10}$ ∞ | | | |
| | $d_{10}$ 5.71 | $N_6$ 1.7440 | $\nu_6$ 44.9 |
| $r_{11}$ −69.83 | | | |
| Σd 63.28 | | | |

$$\frac{1}{f_1} = 0.009 \qquad -\frac{1}{f_{45}} = 0.00186$$

$$-\frac{1}{F_{23}} = 0.00274 \qquad \frac{N_1 + N_6}{2} = 1.732$$

* * * * *

UNITED STATES PATENT OFFICE
CERTIFICATE OF CORRECTION

Patent No. 4,444,473            Dated April 24, 1984

Inventor(s) Yoshinobu Kudo

It is certified that error appears in the above-identified patent and that said Letters Patent are hereby corrected as shown below:

Column 1, line 67, delete "conves" and insert --convex--.

Column 2, line 33, delete "whichare" and insert --which are--.

Column 3, line 31, delete "the" and insert --The--.

Column 3, line 35, delete "distanceconsecutively" and insert --distance consecutively--.

UNITED STATES PATENT OFFICE
CERTIFICATE OF CORRECTION

Patent No. 4,444,473     Dated April 24, 1984

Inventor(s) Yoshinobu Kudo

It is certified that error appears in the above-identified patent and that said Letters Patent are hereby corrected as shown below:

Column 4, line 66, after ")5)" insert --(5)--.

Column 6, line 25, delete "0.8is" and insert --0.8 is--.

Column 8, line 23, delete "$n_1$.7495" and insert --$n_1$ 1.7495--.

Column 11, line 55, delete "thid" and insert --third--.

Signed and Sealed this

Seventeenth Day of June 1986

[SEAL]

Attest:

DONALD J. QUIGG

Attesting Officer     Commissioner of Patents and Trademarks